United States Patent
Cook et al.

(10) Patent No.: US 10,820,053 B2
(45) Date of Patent: Oct. 27, 2020

(54) EXTENSION BUNDLE GENERATION FOR RECORDING EXTENSIONS IN VIDEO DELIVERY

(71) Applicant: HULU, LLC, Santa Monica, CA (US)

(72) Inventors: Joshua Cook, Tarzana, CA (US); Ale Capistrano, Santa Monica, CA (US); Yingan Wang, Los Angeles, CA (US)

(73) Assignee: HULU, LLC, Santa Monica, CA (US)

( * ) Notice: Subject to any disclaimer, the term of this patent is extended or adjusted under 35 U.S.C. 154(b) by 138 days.

(21) Appl. No.: 16/211,050

(22) Filed: Dec. 5, 2018

(65) Prior Publication Data

US 2020/0186886 A1    Jun. 11, 2020

(51) Int. Cl.
*H04N 7/173*       (2011.01)
*H04N 21/472*      (2011.01)
*H04N 21/258*      (2011.01)
*H04N 21/266*      (2011.01)
*H04N 21/4147*     (2011.01)

(52) U.S. Cl.
CPC .  *H04N 21/47202* (2013.01); *H04N 21/25816* (2013.01); *H04N 21/266* (2013.01); *H04N 21/4147* (2013.01)

(58) Field of Classification Search
CPC ........... H04N 21/47202; H04N 21/266; H04N 21/4147
USPC ......................................................... 725/87
See application file for complete search history.

(56) References Cited

U.S. PATENT DOCUMENTS

| | | | | |
|---|---|---|---|---|
| 7,478,238 | B2* | 1/2009 | Hooper | H04N 5/913 713/165 |
| 7,533,405 | B2* | 5/2009 | Kurauchi | G11B 27/034 725/87 |
| 7,644,103 | B2* | 1/2010 | Smith | H04L 65/602 707/791 |
| 9,021,468 | B1* | 4/2015 | Pizano | G06Q 30/0609 717/175 |
| 9,948,986 | B2* | 4/2018 | Kwak | H04N 21/43 |
| 10,015,549 | B1* | 7/2018 | Brown | H04N 21/8456 |
| 10,136,174 | B2* | 11/2018 | Ray | G06Q 30/0272 |
| 10,182,096 | B1* | 1/2019 | Siddiqi | H04L 67/1012 |
| 10,298,646 | B2* | 5/2019 | Davies | H04N 21/47202 |
| 2007/0199038 | A1* | 8/2007 | Choi | H04N 5/782 725/134 |
| 2008/0141307 | A1* | 6/2008 | Whitehead | H04N 21/812 725/46 |

(Continued)

*Primary Examiner* — Pankaj Kumar
*Assistant Examiner* — Sahar Aqil Riaz
(74) *Attorney, Agent, or Firm* — Fountainhead Law Group PC

(57) ABSTRACT

In one embodiment, a method receives a request from a user for one or more extensions to a first program. The first program is associated with a first bundle that indicates the first program starts at a first time and ends at a second time. A second program that starts before the first time or starts after the second time is selected. The second program is associated with a second bundle that indicates the second program ends at the first time or starts at the second time. The method generates an extension bundle that includes information for the one or more extensions and uses the extension bundle to record an extended program for the user that includes the first program and at least a portion of the one or more extensions from the second program.

20 Claims, 10 Drawing Sheets

(56) References Cited

U.S. PATENT DOCUMENTS

| | | | |
|---|---|---|---|
| 2009/0094644 A1* | 4/2009 | Jung | H04N 21/84 725/39 |
| 2009/0325630 A1* | 12/2009 | Tiitola | H04L 67/34 455/550.1 |
| 2010/0057576 A1* | 3/2010 | Brodersen | H04N 7/17318 705/14.69 |
| 2010/0100899 A1* | 4/2010 | Bradbury | H04L 65/4076 725/29 |
| 2010/0146553 A1* | 6/2010 | Lo | H04N 21/266 725/54 |
| 2011/0107379 A1* | 5/2011 | Lajoie | H04L 65/1016 725/87 |
| 2011/0258654 A1* | 10/2011 | Lee | H04N 21/47211 725/1 |
| 2014/0006951 A1* | 1/2014 | Hunter | H04N 21/431 715/719 |
| 2015/0288996 A1* | 10/2015 | van der Schaar | H04N 21/25825 725/116 |
| 2016/0094805 A1* | 3/2016 | Wang | H04N 21/2365 725/93 |
| 2016/0234543 A1* | 8/2016 | Templeman | H04N 5/775 |
| 2016/0269791 A1* | 9/2016 | Laczynski | H04L 67/18 |
| 2016/0309227 A1* | 10/2016 | Casagrande | H04N 21/4147 |
| 2017/0257674 A1* | 9/2017 | Horita | G11B 27/34 |
| 2018/0192134 A1* | 7/2018 | Lau | H04N 21/47202 |

* cited by examiner

EXTENSION BUNDLE GENERATION FOR RECORDING EXTENSIONS IN VIDEO DELIVERY

BACKGROUND

A video delivery service may offer a live programming service where users can view programs offered live via a linear schedule. For example, a user may watch a television program during a certain time period, such as from 8:00 p.m. to 9:00 p.m. The programs may be offered by third-party providers, which may provide metadata that indicates when the programs may start and end. However, this metadata may be wrong, which may negatively affect the user experience. For example, when a user records a program using a digital video recording service (DVR), starting the recording at the wrong time or ending the recording at the wrong time may result in a recording that misses some of the content of the program. Additionally, some programs may have a hand-off between the current program and the next program. The hand-off may be a segment that may end the current program and introduce the next program, which a user may want to view in the recording. A hard cut-off time may not account for the hand-off and might miss part of the hand-off in the recording.

DETAILED DESCRIPTION

Figure 1:
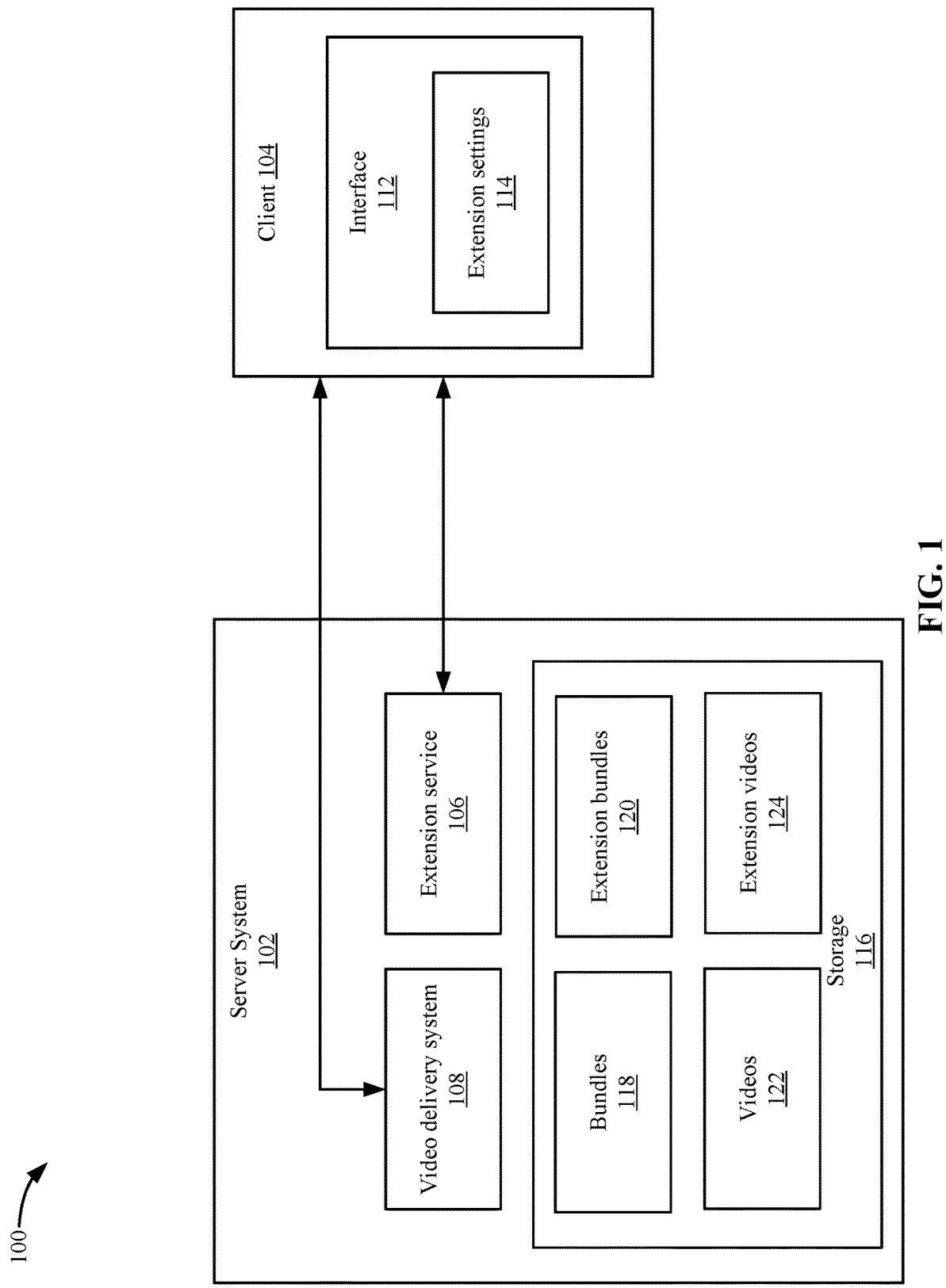
FIG. 1 depicts a simplified system that uses extension bundles according to some embodiments.

Described herein are techniques for a video delivery and recording system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A video delivery service may offer both live programs and on demand programs. To keep track of the videos in the catalog, the video delivery service may generate a database to manage the different programs. In some embodiments, the database stores bundles that correspond to programs being offered on the service. A bundle may indicate the starting time and the ending time of the program in addition to a user entitlement. The starting time and the ending time may be hard cut-off times where the program starts and ends, such as 8:00 p.m. to 9:00 p.m. The entitlement may be an indication of which users may be able to view the program. Each program may be associated with at least one bundle.

The bundles control access to the program and determine the video that is recorded for a user in a digital video recorder (DVR) service. When a user records a program with an extension, such as a one minute, two minutes, five minutes, ten minutes, etc. extension, before and/or after the program, the video delivery service may not just use the individual bundle for the program to record a video with the extension because the individual bundle only covers the original program without the extension. For example, the one minute extension before the program may come from a first program that is before the current program and the one minute extension after the current program may come from a second program that is after the current program.

Using the individual bundles for the programs, the video delivery service does not have bundles that match exactly to the times that were requested for the recording. That is, there is not an individual bundle that starts one minute before the current program and one minute after the current program. To address this problem, the video delivery service generates an extension bundle that may be used to record the program with the extensions. For example, the extension bundle may be a bundle that defines the time before and/or after the current program for a requested extension. However, the content before and after the current program belongs to other programs and the video delivery service first checks whether a user can request an extension. The video delivery service first analyzes bundles for the other programs, such as a first bundle for the first program before the current program and a second bundle for a second program after the current program, to determine whether an extension bundle can be generated for the user. For example, the video delivery service determines whether the user has the correct entitlements to view the first program and the second program. If so, the video delivery service creates an extension bundle that includes the extensions to the current program. The video delivery service may also generate a video that corresponds to the extension bundle, such as a video that includes one minute before the current program and one minute after the current program. Then, the video delivery service uses the extension bundle to record the program with the extensions.

Using the extension bundles allows the video delivery service to continue to use bundles to perform services. For example, a cloud DVR service may use a single bundle to record a program with extensions. Using the extension bundle keeps the configuration of the cloud DVR the same whether the cloud DVR is recording a program without extensions or with extensions. Further, the playback of the program may use an individual bundle, which will be the same when playing back a program without extensions or with extensions. That is, a playback service may still use a single bundle to cause playback of a program with or without extensions.

Using extension bundles may also comply with applicable requirements for the video delivery service, such as that the video delivery service must maintain a distinct copy of a video for each video recorded. For example, when a program with one minute before and one minute after is recorded, a separate video with the video from one minute before the program and one minute after the program needs to be separately created. When an extension bundle is created, the video delivery service can create a video that includes content from multiple programs that satisfy the applicable requirements. In some embodiments, the video delivery service is required to maintain a personal copy of a video when extensions are applied.

System

FIG. 1 depicts a simplified system 100 that uses extension bundles according to some embodiments. System 100 includes a server system 102 and client 104. Although single instances of server system 102 and client 104 are shown, it will be understood that multiple clients 104 may be served by a video delivery service and that server system 102 may include multiple computing devices with the functions described distributed among the multiple computing devices.

Server system 102 includes a video delivery system 108 that delivers videos to clients 104. For example, a program may be a show, a movie, a short, a trailer, etc. A video corresponding to the program may be delivered to the user. In this description, the term program and video may be used interchangeably. A video delivery service may use video delivery system 108 to cause videos to be delivered on clients 104 (e.g., via content delivery networks). In some embodiments, the video delivery service may offer a video on-demand service in addition to a live programming service. The video on-demand service allows users to request programs at any time. However, the live programming service may offer programs on a linear schedule in which users can only view the program while the programs are live.

Users may use clients 104 to view the programs on interface 112. In some embodiments, a user may request and watch a live program at a certain time that the program is being offered. A user may also set extension settings 114 for one or more programs that may indicate the user wants to record a current program with some type of time extension. For example, a user may have the option to record some amount of a program before or after the current program, which extends the recording of the current program. The video delivery service may offer extensions in certain increments, such as one minute, two minutes, five minutes, etc. In other examples, the extension time may be dynamic. For example, a video delivery service may dynamically determine an extension for a live sporting event based on how long the sporting event lasts, such as the event may go into overtime and the extension lasts until overtime ends.

A user may use interface 112 to input extension settings 114. In some examples, a user may choose to record a program with one minute of content before the beginning of the current program and one minute of content after the end of the current program. The one minute of content before the current program may be one minute of content from a first program being offered on a same channel as the current program in the linear schedule, and the one minute after the end of the current program may be one minute of content from a second program scheduled to start after the end of the current program on the same channel.

In other examples, the video delivery service may automatically determine extension settings 114. For example, a video delivery service may determine that a program may last past the scheduled end time, such as in the live sporting event example above. In this example, the video delivery service may set extension settings 114 to extend the current program. An extension service 106 may then record programs according to extension settings 114.

Before describing the extension service in more detail, the use of bundles 118 will be described in more detail. For each program being offered in the live video service, a corresponding video 122 may be stored in storage 116. For example, for a program offered from 8:00 p.m. to 9:00 p.m., server system 102 stores a video in storage 116 with content from 8:00 p.m. to 9:00 p.m., but no other content from outside that time period. Also, server system 102 creates a bundle 118 that corresponds to the video and includes metadata that describes the program. For example, bundle 118 may include a program identifier, the start time of the program, the end time of the program, and the entitlements of the program. Video delivery system 108 uses this bundle to send the program to client 104 for playback and also to record the program using a cloud DVR service.

In some examples, the video delivery service may abide by a requirement that any program recorded from a start time to an end time must have a separate video stored in storage 116. For example, for a program that begins at a time T0 and ends at a time T1, a single video 122 may be stored in storage 116. However, if the video delivery service is going to record a video with an extension before or after the current program, the video delivery service may need to create an extension video 124 for that recording. For example, the video delivery service may not record a video from two separate videos that have been stored in storage 116 due to certain requirements. In some embodiments, a regulation may require that a program that is recorded from a first time to a second time have a corresponding video that starts from the first time and ends at the second time stored in storage 116. To address this, server system 102 may store extension videos 124 that include extensions to an original video 122 for a program. These extension videos 124 include content from multiple programs and have start and end times that may be adjusted according to the extensions that are applied to the current program. Also, server system 102 may store extension bundles 120 that correspond to extension videos 124. Extension bundles 120 may describe the extension applied to an original program. For example, an extension bundle 120 may define that a user has requested an extension of one minute before a program and one minute after a program. By using extension bundles, video delivery system 108 can continue to use individual bundles to perform services, such as recording programs and sending videos for programs to client 104 for playback. Although the generation of separate videos is described, it will understood that the video delivery service may not have to create different videos for the extensions if not required. For example, the video delivery service may record a video from two different videos for two different programs.

In some examples, extension bundles 120 may be virtual bundles. For example, an extension bundle may include information that can be used to determine the extension or extensions that should be applied to an original program. In some examples, the extension bundle may indicate the program ID and then indicate the extension is one minute before and/or after a current program. In other examples, extension bundle 120 may indicate a start time (e.g., 7:55 p.m.) and an end time (e.g., 9:05 p.m.) that is before the start time and/or after the end time of the current program.

Extension Scenarios

Figure 2A:
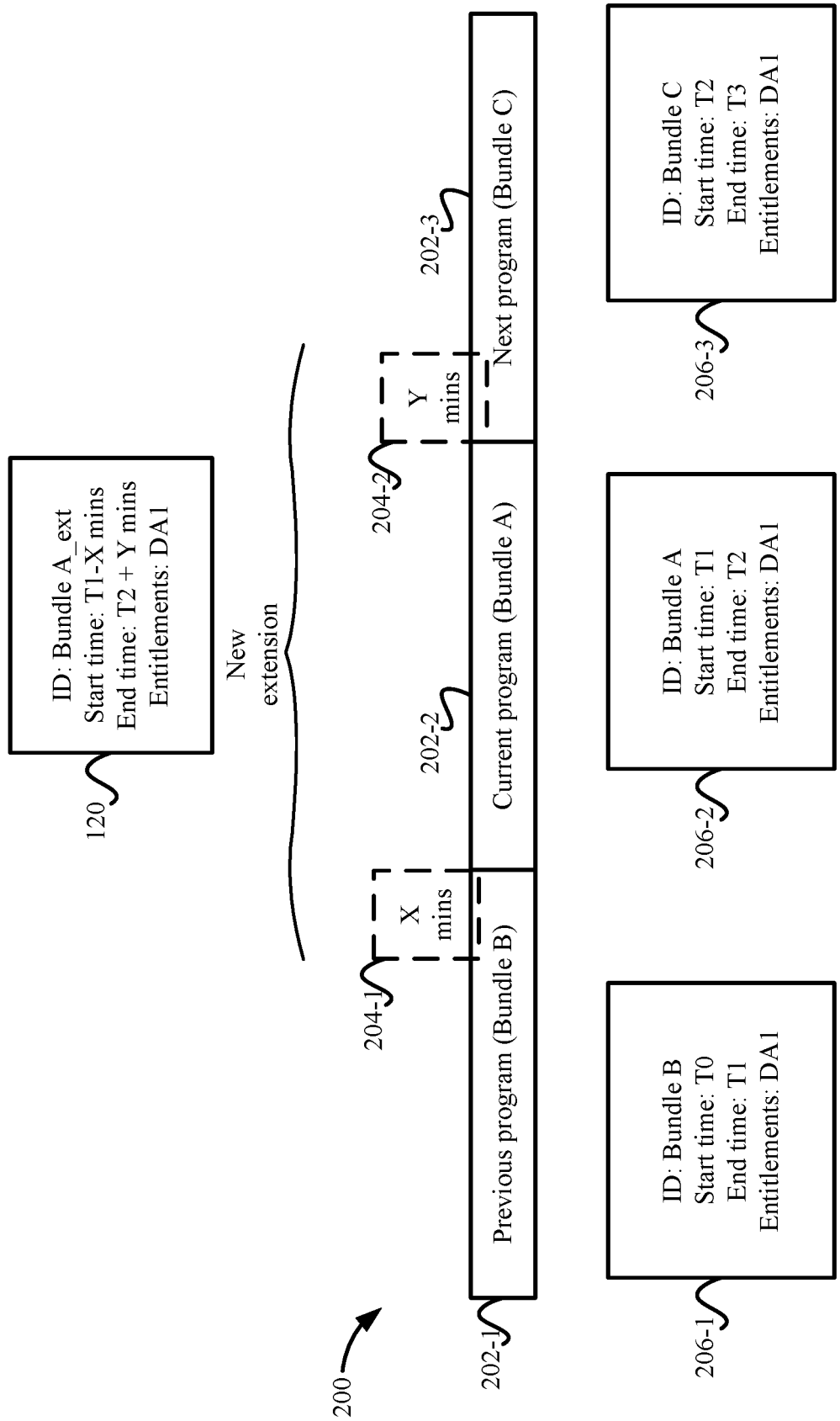
FIG. 2A depicts an example of a first extension that is applied before the current program and a second extension that is applied after the current program according to some embodiments.
Figure 2B:
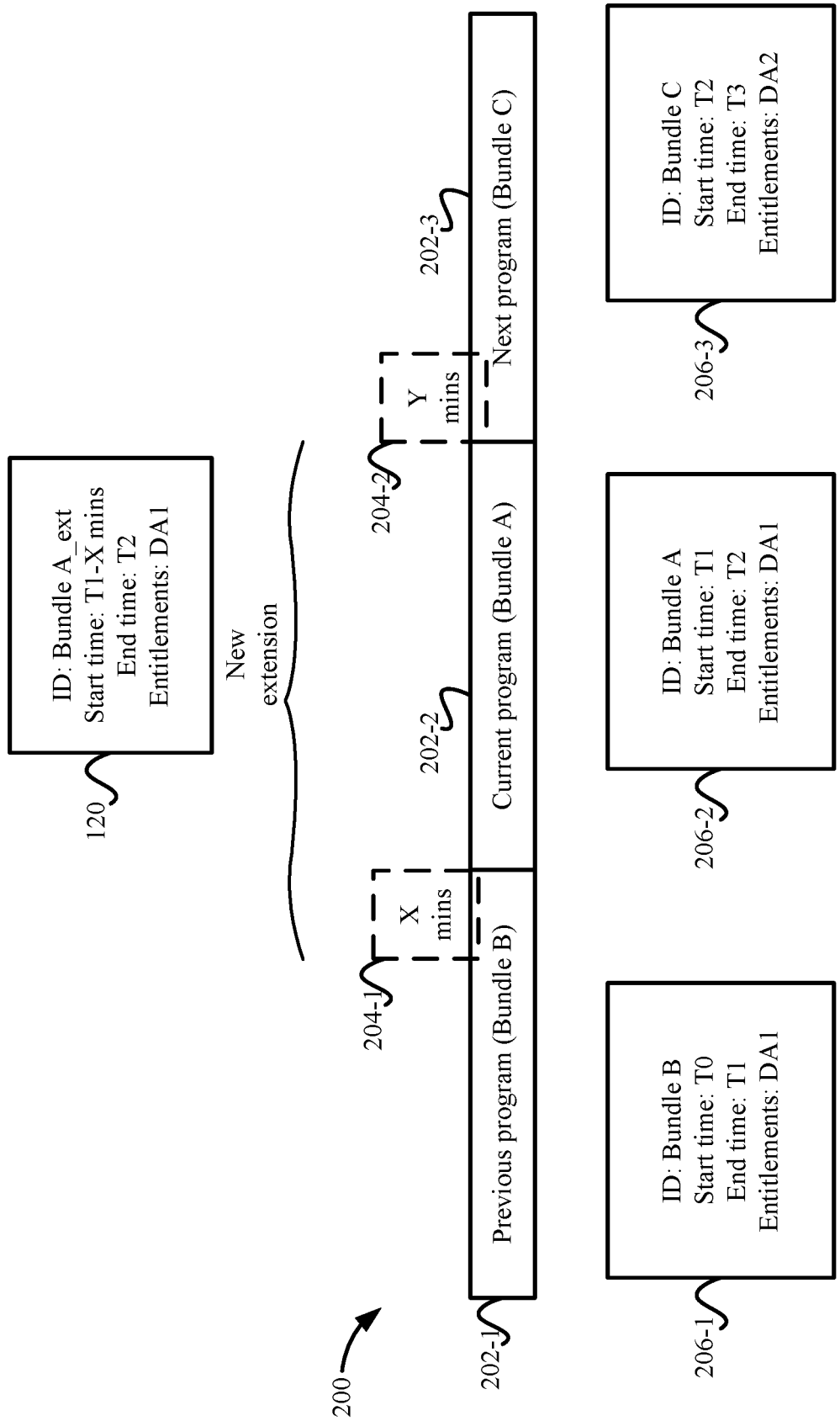
FIG. 2B shows an example of an extension that only includes content from before the current program according to some embodiments.
Figure 2C:
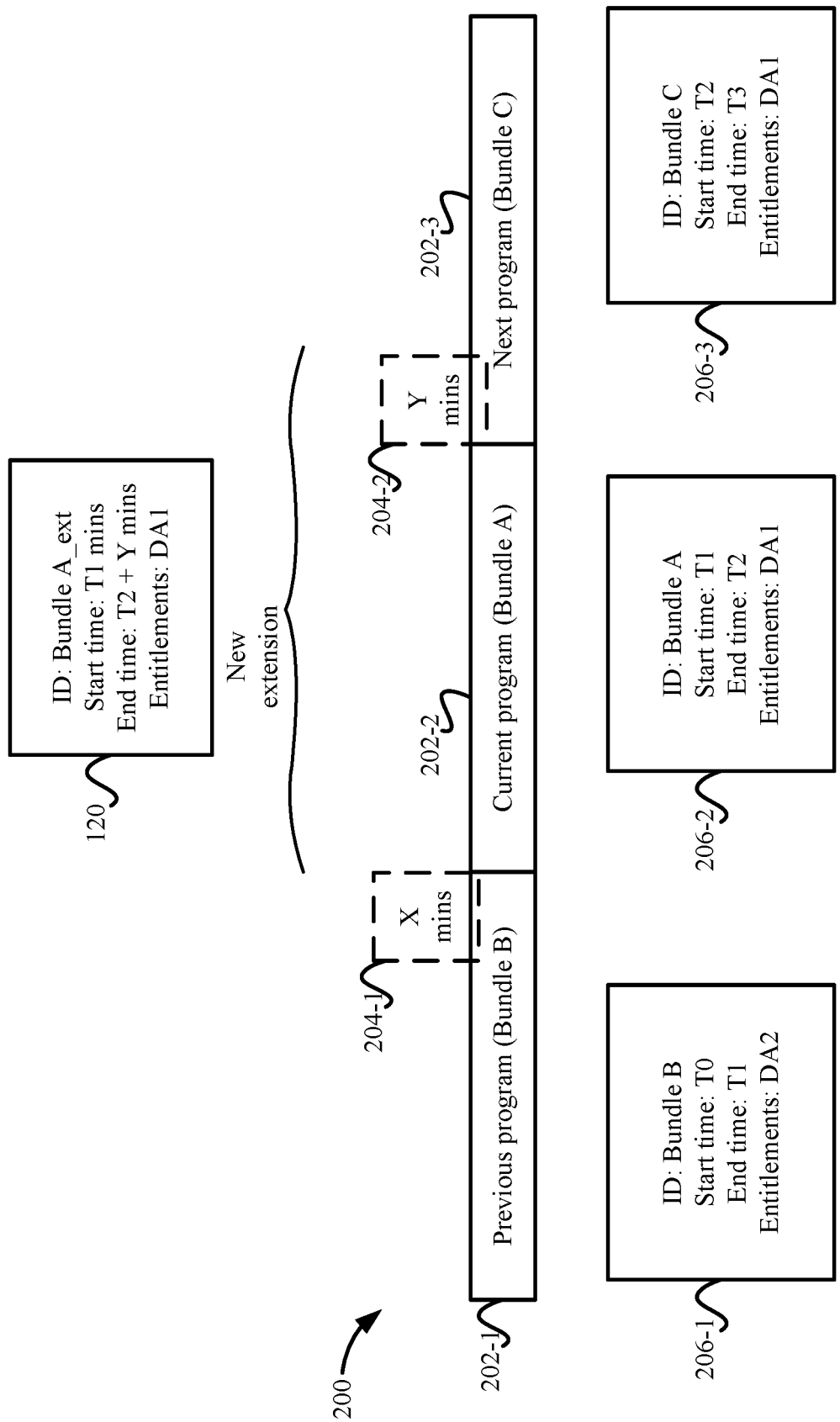
FIG. 2C depicts an example where the user is not entitled to access the previous program according to some embodiments.

Depending on the entitlements and a user's extension request, different extension scenarios may result. FIGS. 2A-2C depict different extension scenarios according to some embodiments. Although these extension scenarios are described, other extension scenarios may be appreciated.

FIG. 2A depicts an example of a first extension that is applied before the current program and a second extension that is applied after the current program according to some embodiments. A user may be able to specify extensions before and after a current program by selecting from various pre-set times, such as one minute, two minutes, five minutes, etc. Additionally, the user may select customized times, such as by using a slider bar to select the extension or by inputting a custom time, such as one minute and 20 seconds.

At 200, a timeline shows a linear schedule that includes a previous program 202-1, a current program 202-2, and a next program 202-3. The previous program corresponds to a bundle B shown at 206-1; the current program corresponds to a bundle A shown at 206-2; and the next program corresponds to a bundle C shown at 206-3. As mentioned above, each program may be associated with a bundle.

Each bundle may include a program ID, a start time, an end time, and an entitlement. At 206-1, a previous program starts at a time T0 and ends at a time T1, and includes an entitlement of a distribution area (DA1). A distribution area may be a definition, such as a geographical location, that can be applied to a characteristic of a user, such as the user's geographical location. For example, if a user has a location that is within the area defined by distribution area DA1, the user is able to access and view any programs that have entitlement of distribution area DA1. The distribution area may also define other characteristics, such as the user's device type, subscription package, etc.

The current program starts at a time T1 and ends at a time T2 and also has the same entitlement DA1. After the current program, bundle C indicates that the next program starts at a time T2, ends at a time T3, and has the same entitlement DA1. Accordingly, the previous program, the current program, and the next program are located sequentially in the linear program schedule and have the same entitlements. Also, the previous program, the current program, and the next program are sequentially played in a stream or a channel. For example, if a user were to continue to watch the stream or channel, the previous program, the current program, and the next program would be played in sequence.

The available extensions include a first extension 204-1 that includes content from the previous program and also a second extension 204-2 that includes content from the next program. The user can select one of the following: an extension before the current program, an extension after the current program, or an extension before the current program and after the current program. In this example, it is assumed that the user has selected both extensions 204-1 and 204-2.

Although the user has selected extensions in both the previous program and the next program, extension service 106 may need to determine whether or not the user is entitled to view content from the previous program and the next program. For example, the user may be entitled to view the current program, but not the previous program or the next program. Accordingly, extension service 106 may check the entitlement for the previous program and determine whether or not the user is entitled to access the previous program. Similarly, extension service 106 may check the entitlement for the next program to determine whether or not the user can access the next program.

In this example, the entitlements for the previous program, the current program, and the next program are the same distribution area DA1. Accordingly, the user is entitled to view all three programs and extension service 106 can generate a new extension that includes the X minutes before the current program, the current program, and the Y minutes of the next program. Also, extension service 106 may generate an extension bundle 120 that includes an ID of bundle A_ext with a start time of T1–X minutes and an end time of T2+Y minutes, and an entitlement of distribution area DA1. As mentioned above, the extension bundle may take different forms to indicate that the current program should include X minutes before time T1 and Y minutes after time T2.

There may be cases where a user may not be entitled to view either the previous program or the next program, or the user may only request an extension before the current program or after the current program. FIG. 2B shows an example of an extension that only includes content from before the current program according to some embodiments. In this example, the user has requested the same extensions before and after the current programs. However, in other embodiments, the user may not request extension 204-2 after the current program, which would result in the same extension bundle as described, but without needing to perform the entitlement check for the extension after the current program.

The next program is associated with a bundle C that includes a different entitlement of distribution area DA2 than the entitlement of distribution area DA1 described in FIG. 2A. In this example, the user may not be entitled to access a program that has the entitlement of distribution area DA2. For example, the entitlement distribution area DA2 may be for a different geographical area than the entitlement DA1, and the user is not in that geographical area. Accordingly, extension service 106 determines that the user is not entitled to access content from the next program. An extension 204-2 that includes the Y minutes in the next program is thus not available to the user. Accordingly, extension service 106 may not include extension 204-2 in the extension bundle. Rather, extension service 106 generates a new extension that includes the X minutes from the previous program and the current program. In this case, an extension bundle 120 may include an identifier bundle A_ext and includes a start time of T1–X minutes and an end time of T2 with an entitlement of DAL The time of T2 is the end of the current program.

FIG. 2C depicts an example where the user is not entitled to access the previous program according to some embodiments. The bundle B for the previous program includes an entitlement of distribution area DA2. Similar to above, the user is not entitled to access the previous program. Also, instead of not being entitled to the previous program, the user could have not requested an extension in the previous program. Accordingly, the new extension in this example includes the current program and the Y minutes of the next program. Extension bundle 120 includes the ID of bundle A_ext with a start time of T1 and an end time of T2+Y minutes, and an entitlement of distribution area DA1.

Extension Service

Figure 3:
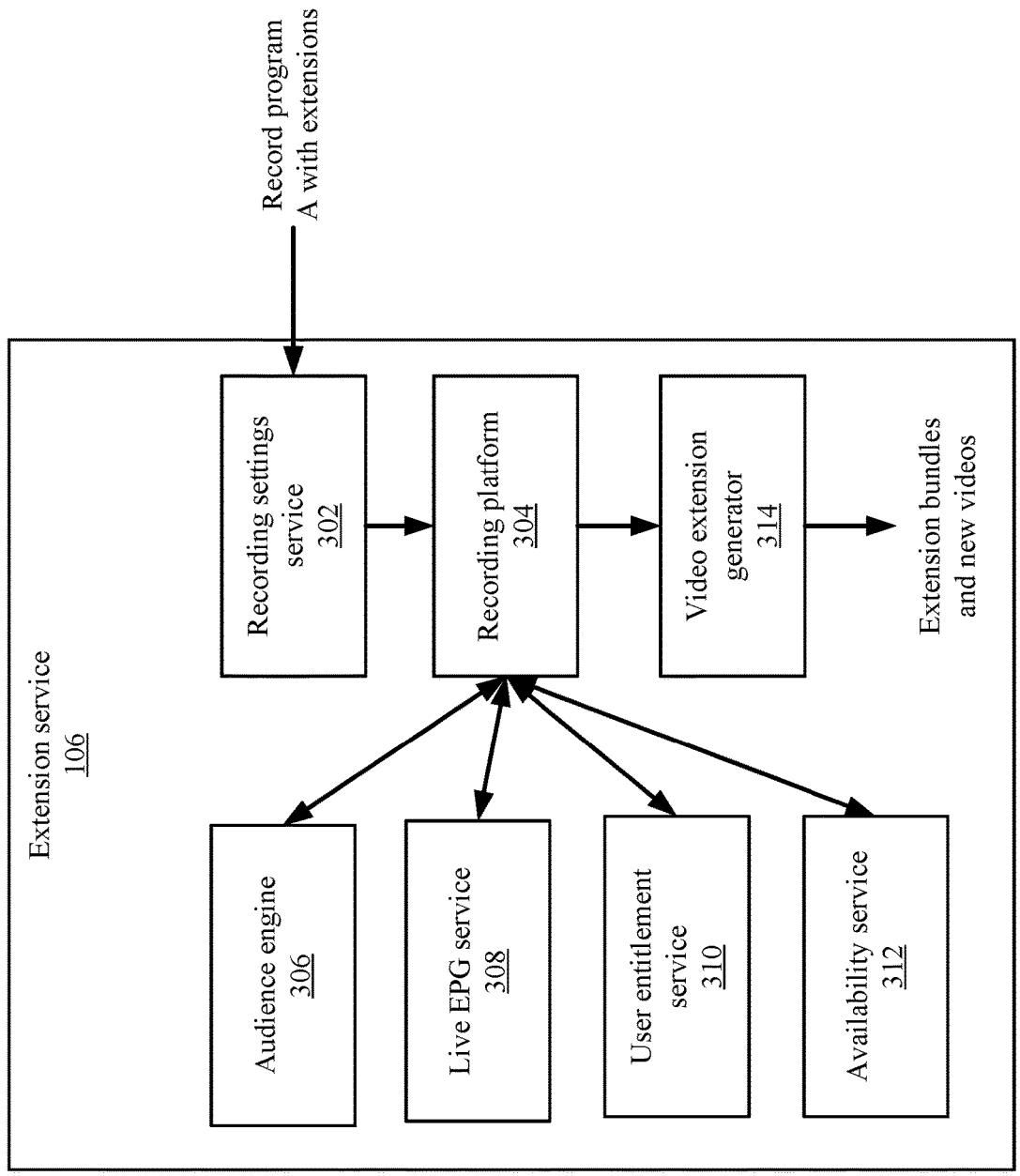
FIG. 3 depicts a more detailed example of an extension service according to some embodiments.

FIG. 3 depicts a more detailed example of extension service 106 according to some embodiments. Extension service 106 includes a recording settings service 302 that can receive requests for recording a current program with extensions. Recording settings service 302 may store which extensions each user has requested.

A recording platform 304 may then process the requests to record the programs using various services associated with the video delivery service. For example, recording platform 304 communicates with an audience engine 306 to determine information for users of the video delivery service, such as user identifiers. Recording platform 304 then determines which users have requested extensions by matching the requests received from recording settings service 302 and the user information from audience engine 306. For example, the requests that are received may include user or device identifiers and audience engine 306 may determine which users have requested the extensions based on the user or device identifiers.

Recording platform 304 then determines the previous program to the current program and the next program to the current program using a live electronic program guide (EPG) service 308. For example, the electronic program guide may indicate which programs are before and after the current program in a linear schedule. Recording platform 304 can then determine the bundles for the programs before and after the current program. For example, using the program IDs from live EPG service 308, recording platform 304 can retrieve the bundles for the program before and the program after the current program in addition to the bundle for the current program.

Recording platform 304 can then query user entitlement service 310 to determine the entitlements for each user. For example, each user may have his/her user specific entitlement based on various factors, such as the user's location, the user's subscription package, the device being used, etc.

Then, recording platform 304 queries an availability service 312 that can determine whether or not a user has rights to the program before or the program after the current program. Availability service 312 can compare the user entitlements to the entitlements for the program associated with the extensions requested by the user. For example, if a user has requested an extension in the previous program, availability service 312 compares the entitlement for the previous program to the entitlements for the user to determine if the user can access the previous program. The comparison may determine whether or not the user includes an entitlement that meets the entitlement of the previous program. Availability service 312 may also perform similar comparisons for the next program if the user requests an extension that included the next program.

Video extension generator 314 may dynamically generate or pre-calculate the extension bundles, which will be described below in more detail. Once generating the extension bundles, video extension generator 314 may generate a video that corresponds to the extension bundle. As described above, the video may start at the beginning of an extension before the current program and end at an extension after the current program, if requested. For example, content outside of the extension in the previous program will not be included in a new video that video extension generator 314 generates.

Pre-Calculated and Dynamic Extension Bundle Generation

The extension bundles may be dynamically calculated or pre-calculated. The dynamic generation of bundles may allow extension service 106 to not have to generate all combinations of extension bundles that are possible. However, extension service 106 may have to generate extension bundles 120 upon receiving requests from the users and sometimes users may request the extension bundles at different times, such as when a video has already started playing. The pre-calculation of extension bundles may save time because extension service 106 does not have to calculate the extension bundles in real time. For example, extension service 106 can retrieve an extension bundle because all combinations have already been pre-calculated, which avoids having to query the applicable services needed to generate the extension bundle. However, pre-calculating the extension bundles may increase the use of storage. The pre-calculation may occur at any time before a user request for an extension is received. The dynamic calculation may occur after a user request for an extension is received.

Figure 4:
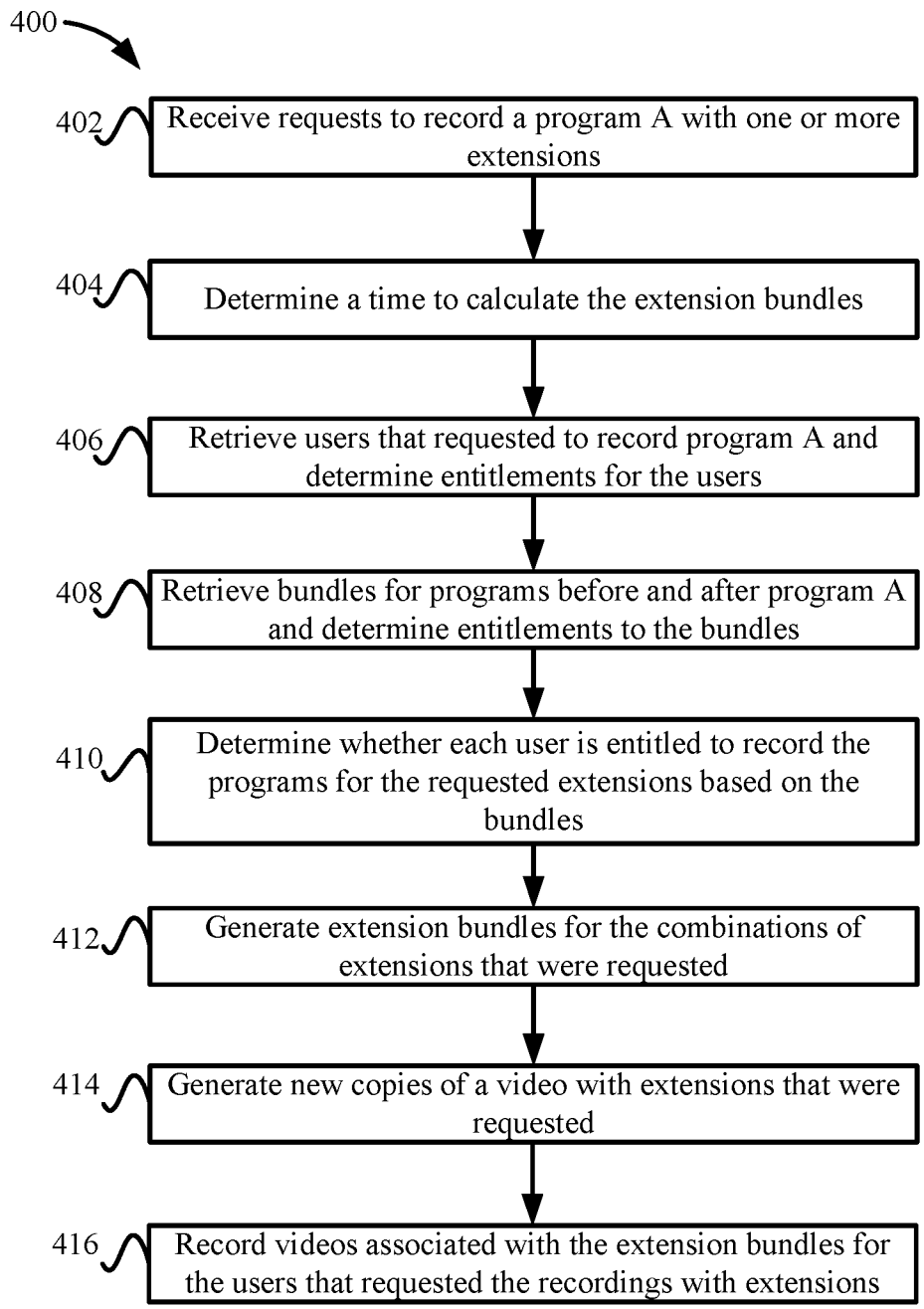
FIG. 4 shows a simplified flow chart of a method for dynamically calculating the extension bundles accordingly to some embodiments.

FIG. 4 shows a simplified flow chart 400 of a method for dynamically calculating the extension bundles accordingly to some embodiments. At 402, extension service 106 receives requests to record a program A with one or more extensions. The extensions may be before the start of program A and/or after the end of program A. Different users may request different combinations of extensions for program A. For example, one user may only request an extension before the start of program A; another user may request extensions before the start of program A and after the end of program A; and another user may only request an extension after the end of program A. Additionally, users may request extensions of different lengths.

At 404, extension service 106 determines a time to calculate the extension bundles. The time may be when program A starts live playback or may be before the start live playback, such as a time before the earliest extension possible to program A. For example, the time may be one hour before the scheduled live playback if the earliest extension is one hour before the start of live playback.

At 406, extension service 106 retrieves the users that sent requests to record program A and determines entitlements for the users. The requests to record a program may be received at different times during the linear schedule. For example, users may have requested to record program A before the start of program A or during the start of program A. If a user requested to record program A after the start of program A, then the recording of program A may start from that point and only an extension after program A is available. However, if a user has requested to record program A with extensions before the start time of program A, then the user may be entitled to record the extension before the start of program A.

Assuming an extension before and after program A was requested, at 408, extension service 106 retrieves bundles for programs before and after program A and determines entitlements to the bundles. If an extension for one of the programs that is before or after the current program is not requested, the bundle would not be retrieved.

At 410, extension service 106 determines whether each user is entitled to record the programs for the bundles for the requested extensions based on the entitlements in the bundles and for the users. For example, extension service 106 checks the entitlements to the bundles for the programs before program A and after program A, and compares the entitlements for those programs to the entitlements of each user. Extension service 106 notes the different combinations in which users were entitled.

At 412, when users are entitled to record the requested extensions, extension service 106 generates extension bundles for the combinations of extensions that were requested. For example, only the specific combinations requested by users that were entitled to record are generated. This eliminates the generation of some extension bundles that are not going to be used. For example, if multiple users have requested a one minute extension in the previous program and a one minute extension in the next program, extension service 106 determines that an extension bundle that starts one minute in the previous program, includes the current program, and ends one minute into the next program should be generated. If there is some combination of extension that has not been requested (e.g., a ten minute extension), extension service 106 may not generate an extension bundle for that combination.

At 414, extension service 106 generates new copies of a video that includes the requested extensions to correspond to the generated extension bundles. Extension service 106 then may use the same extension bundle and same extension video to record the current program with the extensions for all the users that requested each combination of extensions. Extension service 106 may store the new copies of the videos and extension bundles in storage 116.

At 416, extension service 106 records videos associated with the extension bundles for the users that requested the recordings with extensions.

Figure 5:
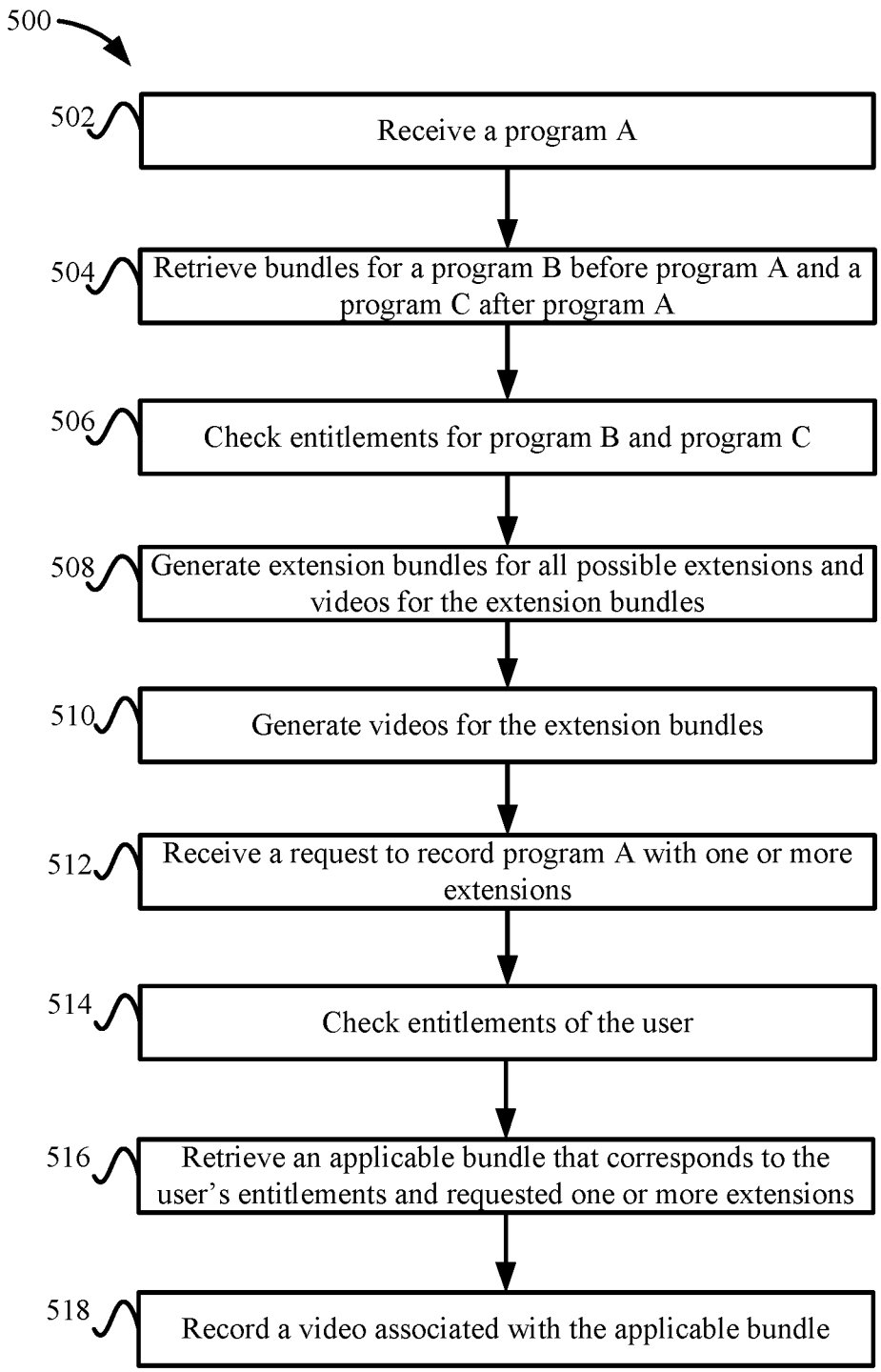
FIG. 5 depicts a simplified flowchart of a method for pre-calculating the extension bundles according to some embodiments.

FIG. 5 depicts a simplified flowchart 500 of a method for pre-calculating the extension bundles according to some embodiments. At 502, extension service 106 receives a program A for delivery. For example, the video delivery service receives a copy of program A from a third party provider. At 504, extension service 106 retrieves bundles for a program B before program A and a program C after program A. Program B may be before program A in a linear schedule and program C may be after program A in the linear schedule.

At 506, extension service 106 checks the entitlements for program B and program C. For example, bundles for program B and program C may include the entitlements for each respective program.

At 508, extension service 106 generates extension bundles for all possible combinations of extensions. For example, there may be multiple extensions that may be possible, such as one minute, two minutes, five minutes, etc. Additionally, there may be various combinations, such as a five minute extension before program A and a one minute extension after program A, a one minute extension before program A and a five minute extension after program A, etc. Extension service 106 may generate extension bundles for all the different combinations that may be possibly requested by users.

At 510, extension service 106 generates videos for the extension bundles. Videos for all the different combinations of extension bundles are generated and stored in storage 116. Generating these videos before the request is received may allow a faster response compared to generating the videos after receiving the request.

At 512, extension service 106 receives a request to record program A with one or more extensions. For example, a user may specify an extension before and/or after program A and a time for the one or more extensions. Then, at 514, extension service 106 checks the entitlements of the user.

At 516, extension service 106 retrieves an applicable bundle that corresponds to the user's entitlements and the requested one or more extensions. For example, if the user had requested an extension one minute before program A and one minute after program A, then extension service 106 determines if the user's entitlements enable the user to access program B and program C. If so, then extension service 106 retrieves the extension bundle that was generated with the extensions of one minute before program A and one minute after program A. In other examples, the user entitlements may not allow the user to record one or more of the extensions. For example, the user may have entitlements to access program B, but not program C. In this case, extension service 106 may not allow the user to request an extension after program A ends. Then, extension service 106 may retrieve an extension bundle that includes one minute before program A, but no extension after program A ends. At 518, extension service 106 records the video associated with the extension bundle for the user. Extension service 106 may perform the above steps in 512 to 518 for every request that is received for recording a program with an extension.

User Interface

Figure 6:
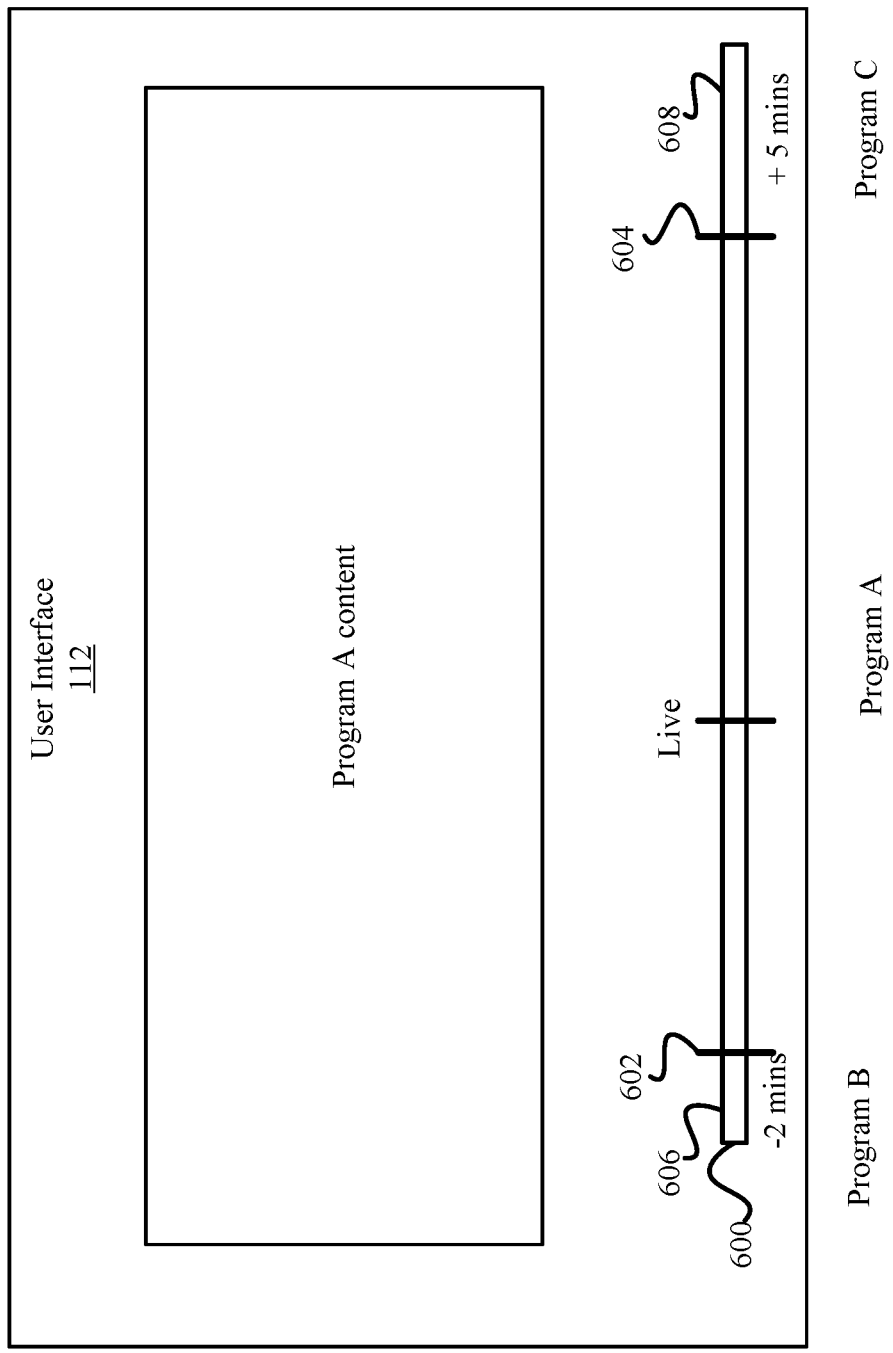
FIG. 6 depicts an example of a user interface according to some embodiments.

Using the extension bundles, video delivery system 108 may generate a unique interface that may visually show the extensions on a timeline. FIG. 6 depicts an example of user interface 112 according to some embodiments. User interface 112 may be displaying a video for program A. Additionally, user interface 112 shows a timeline 600 that displays the progress of a program's playback.

Timeline 600 also shows the extensions that were requested. For example, timeline 600 may indicate the start of program A at 602 and the end of program A at 604. However, using the extension bundle, user interface 112 can display information for extensions that were requested by the user. For example, at 606, user interface 112 shows the extension from a program B that was requested before program A. The time that was requested can be shown exactly on timeline 600. For example, the user may have requested an extension of two minutes before the start of program A. At 608, the extension from a program C after program A ends is shown. In this case, the user may have requested five minutes after the end of program A. Accordingly, user interface 112 shows an exact timeline of the extensions that were requested by a user. Instead of a continuous timeline that shows a linear time (e.g., from 5:00 p.m. to 7:00 p.m.), timeline 600 can show the exact timeline that was recorded for the user using the extension bundle.

Conclusion

Accordingly, a video delivery service that uses bundles that are used to record videos for programs can still use the bundle concept to allow users to request extensions. The extension bundles may be generated and used to record videos for users. This improves the video delivery service use of bundles by allowing extensions to the bundles to be used to record extensions to programs.

System

Figure 7:
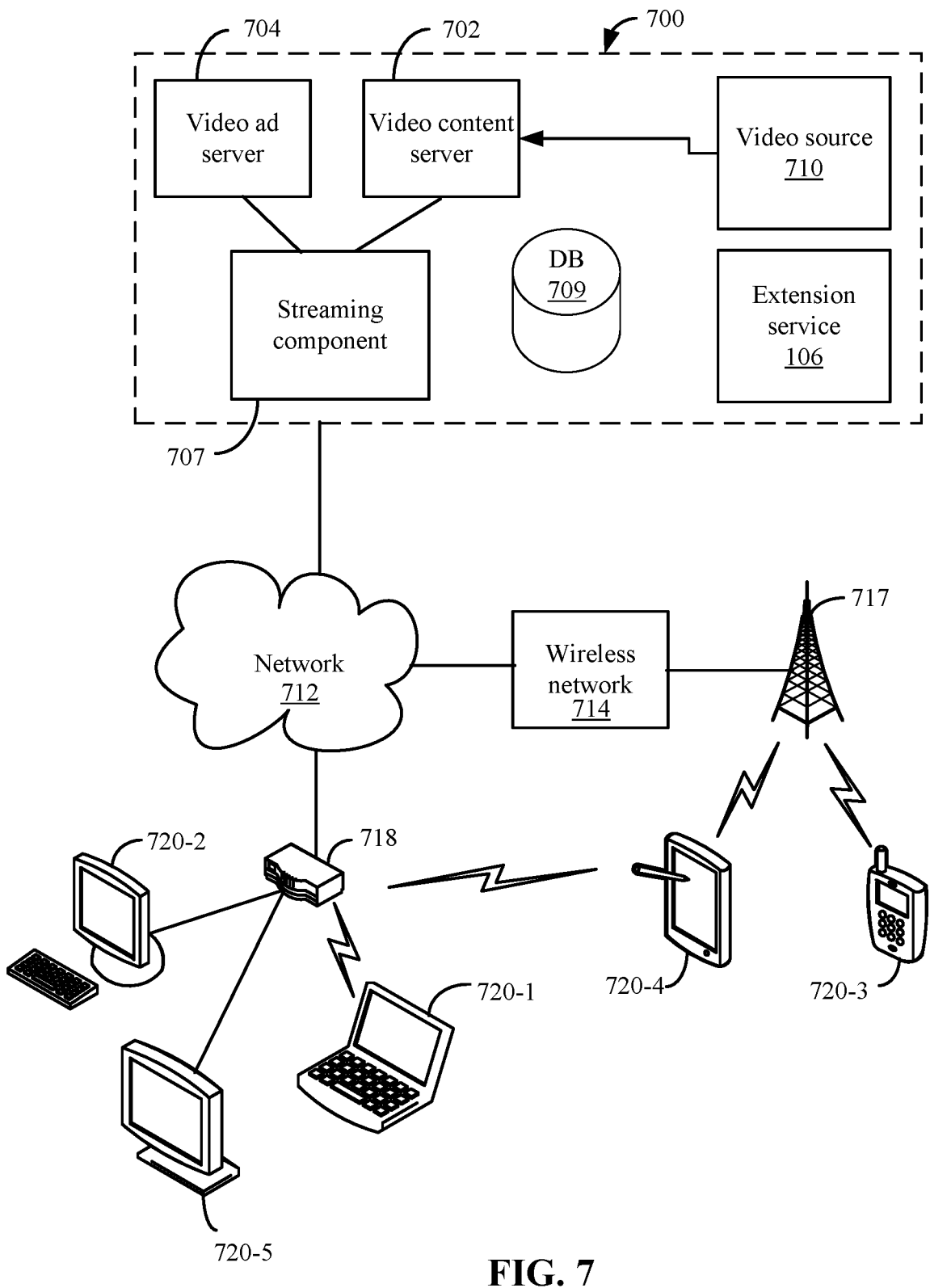
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and/or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 700, a public service message, or some other information. The video advertising server 704 may serve the video advertising segments as directed by a user interface controller (not shown).

The video streaming system 700 also may include extension service 106.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example, administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712, wireless cellular telecommunications network 714, and/or another network. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless cellular telecommunications network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HTTP and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
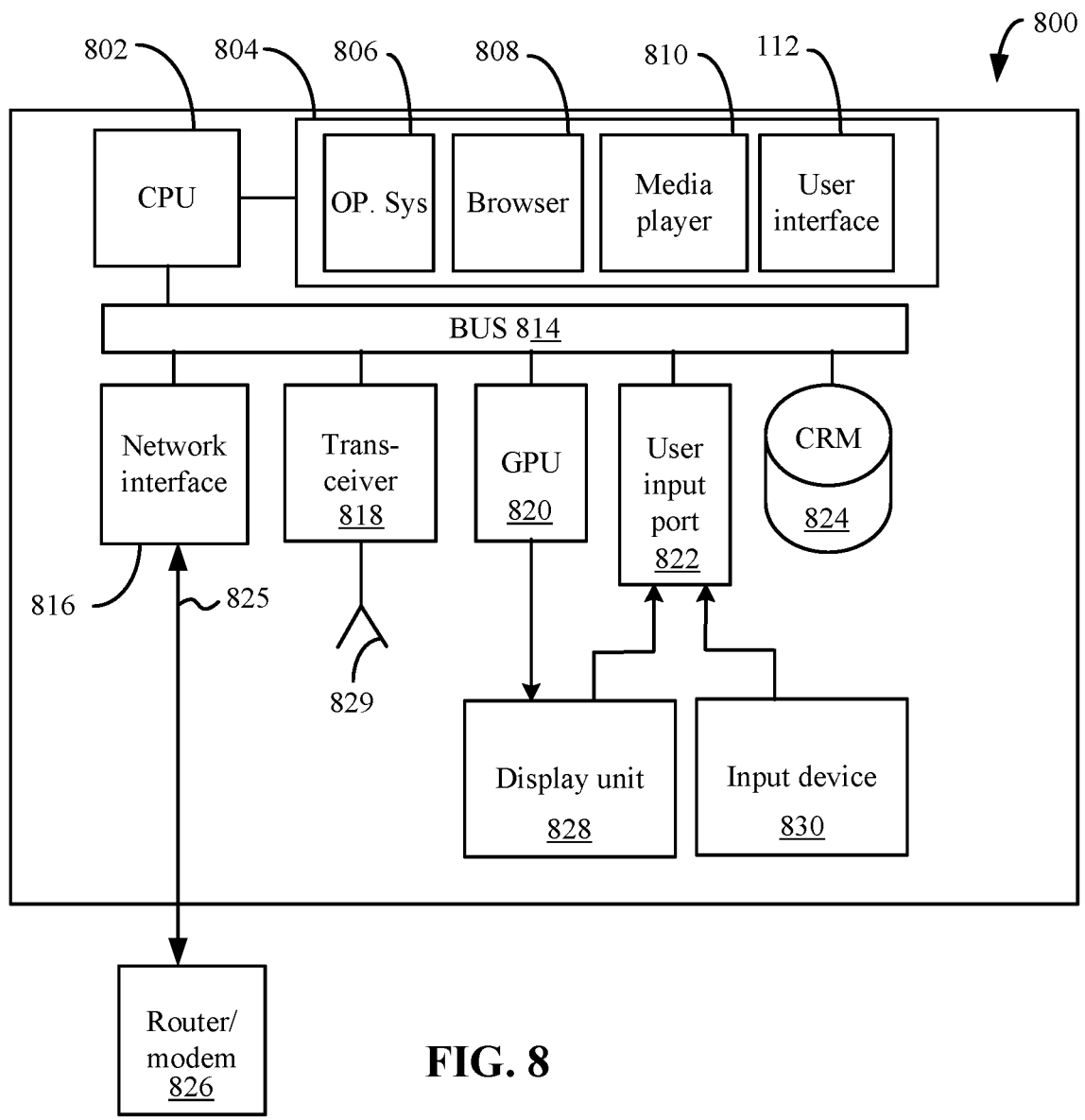
FIG. 8 depicts a diagrammatic view of an apparatus for viewing video content and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The modules may further include user interface 112. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules 806, 808, 810 and 812 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured to perform one or more operations of a method as described herein.

A communication interface 816 may also be connected to the bus 814. The communication interface 816 may provide or support two-way data communication between the apparatus 800 and one or more external devices, e.g., the streaming system 700, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
receiving, by a computing device, a request from a user for one or more extensions to a first program, wherein the first program is associated with a first bundle that indicates the first program starts at a first time and ends at a second time;
selecting, by the computing device, a second program that starts before the first time or starts after the second time, wherein the second program is associated with a second bundle that indicates the second program ends at the first time or starts at the second time;
generating, by the computing device, an extension bundle that includes information for the one or more extensions; and
using, by the computing device, the extension bundle to record an extended program for the user that includes the first program and at least a portion of the one or more extensions from the second program.

2. The method of claim 1, further comprising:
generating, from a first video that includes the first program and a second video that includes the second program, a third video for the extended program.

3. The method of claim 2, further comprising:
storing the third video; and
recording the third video for the user for the extension bundle.

4. The method of claim 2, wherein the third video is stored in addition to the first video for the first program and the second video for the second program.

5. The method of claim 1, wherein:
the one or more extensions comprise a first extension in the second program that starts before the first program and a second extension in a third program that starts after the first program, and
the extended program starts at the first extension in the second program and ends at the second extension in the third program.

6. The method of claim 1, wherein:
the extended program starts at the first time of the first program and ends at a first extension in the second program, or
the extended program starts at a second extension of the second program and ends at the second time of the first program.

7. The method of claim 1, further comprising:
checking a first entitlement for the second program that defines whether the user can access the second program;
determining whether the user can access the second program based on the first entitlement; and
when the user can access the second program, recording the extended program.

8. The method of claim 7, wherein determining whether the user can access the second program based on the first entitlement comprises:
comparing the first entitlement to a characteristic associated with the user.

9. The method of claim 1, wherein the one or more extensions include an extension from a third program, the method further comprising:
checking a second entitlement for the third program that defines whether the user can access the third program;
determining whether the user can access the third program based on the second entitlement;
when the user can access the third program, recording the extended program with an extension in the one or more extensions from the third program; and
when the user cannot access the third program, not recording the extended program with an extension in the one or more extensions from the third program.

10. The method of claim 1, wherein:
a plurality of extension bundles are created for the first program and the second program, each extension bundle including different combinations of extension times for the second program, and
the extension bundle that includes information for the one or more extensions is retrieved from the plurality of extension bundles.

11. The method of claim 10, wherein the plurality of extension bundles are created before the first program starts at the first time.

12. The method of claim 1, wherein:
the extension bundle is generated dynamically upon receiving the request from the user for the one or more extensions.

13. The method of claim 1, further comprising:
receiving a plurality of requests from a plurality of users for extensions to the first program; and
generating extension bundles with combinations of extensions from the second program that meet the requests.

14. The method of claim 1, wherein the one or more extensions are selected from a plurality of different extension times in the second program.

15. A non-transitory computer-readable storage medium containing instructions, that when executed, control a computer system to be configured for:
receiving a request from a user for one or more extensions to a first program, wherein the first program is associated with a first bundle that indicates the first program starts at a first time and ends at a second time;
selecting a second program that starts before the first time or starts after the second time, wherein the second program is associated with a second bundle that indicates the second program ends at the first time or starts at the second time;
generating an extension bundle that includes information for the one or more extensions; and
using the extension bundle to record an extended program for the user that includes the first program and at least a portion of the one or more extensions from the second program.

16. The non-transitory computer-readable storage medium of claim 15, further configured for:
generating, from a first video that includes the first program and a second video that includes the second program, a third video for the extended program.

17. The non-transitory computer-readable storage medium of claim 16, further comprising:
storing the third video; and
recording the third video for the user for the extension bundle.

18. The non-transitory computer-readable storage medium of claim 15, further configured for:
checking a first entitlement for the second program that defines whether the user can access the second program;
determining whether the user can access the second program based on the first entitlement; and
when the user can access the second program, recording the extended program.

19. The non-transitory computer-readable storage medium of claim 15, wherein the one or more extensions include an extension from a third program, the instructions further configured for:
- checking a second entitlement for the third program that defines whether the user can access the third program;
- determining whether the user can access the third program based on the second entitlement;
- when the user can access the third program, recording the extended program with an extension in the one or more extensions from the third program; and
- when the user cannot access the third program, not recording the extended program with an extension in the one or more extensions from the third program.

20. An apparatus comprising:
- one or more computer processors; and
- a non-transitory computer-readable storage medium comprising instructions, that when executed, control the one or more computer processors to be configured for:
  - receiving a request from a user for one or more extensions to a first program, wherein the first program is associated with a first bundle that indicates the first program starts at a first time and ends at a second time;
  - selecting a second program that starts before the first time or starts after the second time, wherein the second program is associated with a second bundle that indicates the second program ends at the first time or starts at the second time;
  - generating an extension bundle that includes information for the one or more extensions; and
  - using the extension bundle to record an extended program for the user that includes the first program and at least a portion of the one or more extensions from the second program.

* * * * *